: US 9,943,023 B2
(45) Date of Patent: Apr. 17, 2018

(12) United States Patent
Komatsu et al.

(54) LIFT CONTROL APPARATUS FOR GROUND WORK APPARATUS

(71) Applicant: KUBOTA CORPORATION, Osaka (JP)

(72) Inventors: Shigeru Komatsu, Osaka (JP); Keiji Takahashi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/806,052

(22) Filed: Jul. 22, 2015

(65) Prior Publication Data

US 2016/0029546 A1  Feb. 4, 2016

(30) Foreign Application Priority Data

Aug. 1, 2015 (JP) ................................ 2014-157698

(51) Int. Cl.
*A01B 71/02* (2006.01)
*A01B 63/02* (2006.01)
(Continued)

(52) U.S. Cl.
CPC .............. *A01B 71/02* (2013.01); *A01B 59/00* (2013.01); *A01B 63/00* (2013.01); *A01B 63/02* (2013.01); *A01B 63/10* (2013.01)

(58) Field of Classification Search
CPC ......... A01B 71/02; A01B 63/02; A01B 59/00; A01B 63/00; A01B 63/10
(Continued)

(56) References Cited

U.S. PATENT DOCUMENTS

2008/0142232 A1* 6/2008 Palmer .................. E02F 9/2296
172/2
2008/0269956 A1* 10/2008 Dix ...................... A01B 69/008
701/1
(Continued)

FOREIGN PATENT DOCUMENTS

CA  2313347  1/2001
JP  63-059803  3/1988
(Continued)

OTHER PUBLICATIONS

Search Report issued with respect to Japan counterpart application No. 2014-157698 with English translation.
(Continued)

*Primary Examiner* — Redhwan K Mawari
(74) *Attorney, Agent, or Firm* — Greenblum & Bernstein, P.L.C.

(57) ABSTRACT

A lift control apparatus includes a height sensor that outputs a height detection signal after a height of a ground work apparatus is detected. The ground work apparatus is coupled to a traveling work vehicle via a lift mechanism. An upper limit manager sets an upper limit position of the ground work apparatus based on an operation input signal from an input operation device for an upper limit setting USD. A setting prohibitor prohibits, when the upper limit position being set by the operation input signal is lower than the height of the ground work apparatus based on the height detection signal, the setting of the upper limit position from the operation input signal, and setting the upper limit position to the height of the ground work apparatus based on the height detection signal.

19 Claims, 6 Drawing Sheets

(51) Int. Cl.
*A01B 59/00* (2006.01)
*A01B 63/00* (2006.01)
*A01B 63/10* (2006.01)

(58) Field of Classification Search
USPC .......................................................... 701/50
See application file for complete search history.

(56) References Cited

U.S. PATENT DOCUMENTS

| | | | | |
|---|---|---|---|---|
| 2010/0131150 | A1* | 5/2010 | Knapp | F02N 11/0803 |
| | | | | 701/29.2 |
| 2011/0178684 | A1* | 7/2011 | Umemoto | F16H 61/421 |
| | | | | 701/51 |
| 2013/0158797 | A1* | 6/2013 | Fukano | E02F 9/264 |
| | | | | 701/36 |
| 2014/0330490 | A1 | 11/2014 | Aoki et al. | |

FOREIGN PATENT DOCUMENTS

| | | |
|---|---|---|
| JP | 09-9716 | 1/1997 |
| JP | 09-09716 | 1/1997 |
| JP | 2002-291304 | 10/2002 |
| JP | 2011-050322 | 3/2011 |
| WO | 2013/094283 | 6/2013 |

OTHER PUBLICATIONS

Notification of Reasons for Refusal issued with respect to counterpart Japan application No. 2014-157698 with English translation.

\* cited by examiner

LIFT CONTROL APPARATUS FOR GROUND WORK APPARATUS

CROSS-REFERENCE TO RELATED APPLICATIONS

The present application claims priority under 35 U.S.C. § 119 of Japanese Application No. 2014-157698, filed on Aug. 1, 2014, the disclosure of which is expressly incorporated by reference herein in its entirety.

BACKGROUND OF THE INVENTION

1. Field of the Invention

The present invention relates to a lift control apparatus for a ground work apparatus which is coupled to a vehicle body of a traveling work vehicle via a lift mechanism.

2. Description of Related Art

An agricultural tractor, as one example of the traveling work vehicles mentioned above, is equipped with a lift operation lever to arbitrarily set a lift position of the ground work apparatus, and with a control apparatus to lift/lower the ground work apparatus via the lift mechanism to a lift position being set by the lift operation lever. In addition, an upper limit positioner is included to set an upper limit position of the ground work apparatus, and the control apparatus controls the lift mechanism so as not to exceed the upper limit position of the ground work apparatus regardless of the lift position being set by the lift operation lever.

In such a control apparatus mentioned above, when a worker inadvertently operates an upper limit setter after the engine is stopped, and the upper limit position becomes lower than the height of the ground work apparatus defined by the actual lift arm position, there is a possibility of the ground work apparatus being lowered to the upper limit position at a time the engine is started. Therefore, the lift control apparatus in Japanese Patent Laid-Open Publication H9-9716 includes a function preventing the ground work apparatus from being lowered to the upper limit position, when the position of the ground work apparatus, defined by the lift arm position of the lift mechanism, is higher than the upper limit position being set by the upper limit positioner at the time the engine is started. The function prevents the ground work apparatus from being lowered even though the position of the ground work apparatus is higher than the upper limit position at the time the engine is started.

It is uncommon for an operator to suddenly adjust a height of a ground work apparatus before the engine is started. However, a necessity of adjusting an upper limit of the ground work apparatus occurs frequently during working/traveling. There is a circumstance that control functions with respect to a lift mechanism stop during working/traveling, when the operator resets the upper limit (of the ground work apparatus) to a downward side and the upper limit being set is lower than the actual height of the ground work apparatus, according to a technology of Japanese Patent Laid-Open Publication H9-9716.

SUMMARY OF THE INVENTION

In view of the above circumstance, the present invention provides a lift control apparatus controllable by an operator to reset an upper limit according to his own wish as much as possible, while preventing a ground work apparatus from being lowered inadvertently.

The lift control apparatus according to the present invention for the ground work apparatus which is coupled to a vehicle body of a traveling work vehicle via a lift mechanism includes: a height sensor that outputs a height detection signal after a height of the ground work apparatus is detected; an input operation device for an upper limit setting operated by the operator; an upper limit manager that sets an upper limit position of the ground work apparatus based on an operation input signal from the input operation device for the upper limit setting; and a setting prohibitor prohibiting, when the upper limit position being set by the operation input signal is lower than the height of the ground work apparatus based on the height detection signal, the setting of the upper limit position from the operation input signal, and setting the upper limit position to the height of the ground work apparatus based on the height detection signal.

According to this configuration, when the operator resets the upper limit position near the height of the present ground work apparatus using the input operation device for the upper limit setting, even though the upper limit being set by the operation input signal from the input operation device for the upper limit setting falls below the actual height of the ground work apparatus, the upper limit position is set as the actual height of the ground work apparatus and the lift control function with respect to the ground apparatus does not stop. Therefore, a driver can easily perform the upper limit setting near the actual height of the ground work apparatus while driving a traveling work vehicle.

In one aspect of the present invention, a screen data generator is provided to generate a lift control screen data to display on a display, the height of the ground work apparatus based on the height detection signal and the upper limit position being set by the operation input signal. In this configuration, the operator (driver) can visually confirm the upper position being set by operating the input operation device for the upper limit setting through the display, the upper limit setting work is more simplified. In doing so, by adopting the configuration of the height of the ground work apparatus and the upper limit position being both indicated on the same height scale bar in the lift control screen data, comparison between the actual height of the ground work apparatus and the upper limit position to be set becomes easy and the upper limit setting work is even more simplified.

It is reasonable for the upper limit position, being set by the input operation device for the upper limit setting, is lower than the realizable maximum lift position due to specifications of the lift mechanism. However, there is a need to find out, for the upper limit position being set or trying to be set, the amount of leeway with respect to the maximum lift position. Because of this, as another aspect of the present invention, it is preferable to have the height of the ground work apparatus and the upper limit position indicated on the height scale bar at a rate in relation to a maximum lift stroke.

In another aspect of the present invention, the display is a touch panel operated and the input operation device for the upper limit setting is configured with the touch panel and software buttons displayed on the display. In this configuration, the upper limit setting work is even more simplified by allowing the upper limit position to be set with software buttons operation indicated on the display while looking at the actual height of the ground work apparatus and the upper limit position indicated on the display.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
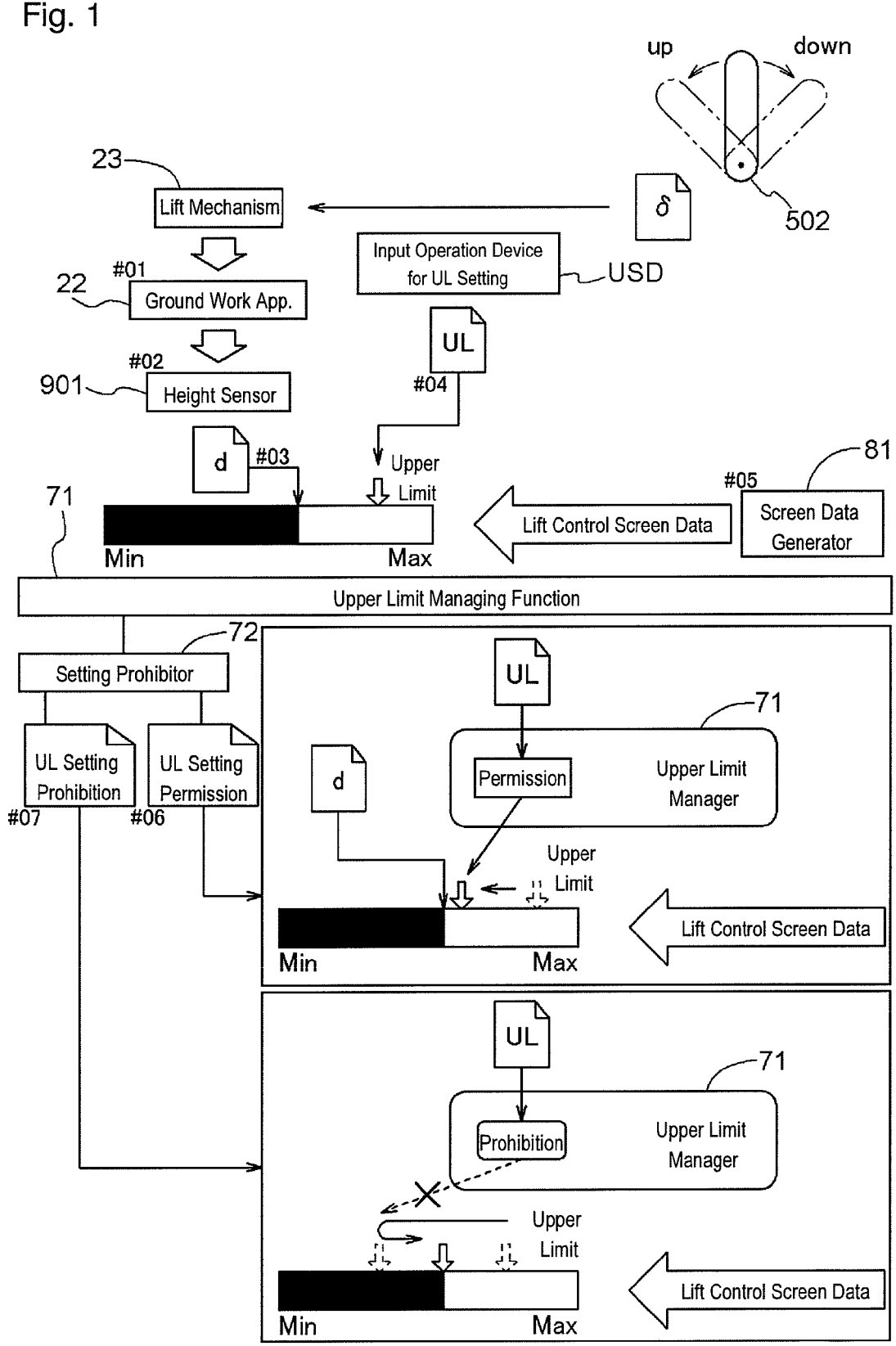
FIG. 1 is a schematic diagram that describes a basic control flow of a lift control apparatus according to the present invention.

Prior to describing a specific embodiment of a harvesting machine according to the present invention, a basic flow of an upper limit setting control is described using FIG. 1, which is a distinctive feature of the present invention. As shown in FIG. 1, a lift control apparatus controls a lift mechanism 23 corresponding to an operation input signal (indicated by "δ" in FIG. 1), based on a displacement operation of a lift operation tool (#01) and a ground height of a ground work apparatus 22 is determined by the lift mechanism 23 (#02). The ground height of the ground work apparatus 22 is detected by a height sensor 901 (#03). A height detection signal (a height detection value) from the height sensor 901 corresponds to an actual height of the ground work apparatus 22 (indicated by "d" in FIG. 1). In order to set a limit of a lift of the ground work apparatus 22 to be lower than a lift maximum stroke, an input operation device for an upper limit setting USD is equipped, which an operator such as a driver or the like operates. The lift control apparatus has an upper limit manager 71, which sets an upper limit position of the ground work apparatus 22 based on the operation input signal (indicated by "UL" in FIG. 1) from the input operation device for the upper limit setting USD.

In order to indicate a mechanical lift range (maximum lift stroke) of the ground work apparatus 22, a horizontal bar chart is included in a lift control screen generated by a screen data generator 81, the horizontal bar chart having a lowest position and a highest lift position on both ends. The lift control screen is displayed on a display arranged near the driver, based on the lift control screen data which is output from the screen data generator 81 (#05). The horizontal bar chart is divided into two regions with the actual height of the ground work apparatus 22 as a boundary. An example in FIG. 1 indicates an amount of the lift of the ground work apparatus 22, on a left region of the bar being colored in black, and a right region indicating an amount of leeway for lifting. In other words, the height and the upper limit position of the ground work apparatus 22 are indicated on the horizontal bar chart as a height scale bar at a rate in relation to the maximum lift stroke. Further, the horizontal bar chart (indicated upper edge of the horizontal bar chart in FIG. 1) indicates the upper limit with a down arrow, which is defined by an upper limit operation signal (indicated by "UL" in FIG. 1) from the input operation device for the upper limit setting USD. Furthermore, other display forms such as a vertical column chart, an arc-shaped chart or the like can be used instead of the horizontal bar chart. Various symbols, letters, or illustrations are also allowed or usable instead of the down arrow as an identifier indicating the upper limit.

The lift control apparatus is equipped with a setting prohibitor 72 which prohibits a setting of the upper limit position when a specific requirement is satisfied. The specific requirement is that the upper limit position being set by the operation input signal is lower than the height of the ground work apparatus 22 based on the height detection signal. Unless the specific requirement is satisfied, an upper limit setting is permitted based on the operation input signal from the input operation device for the upper limit setting USD (#06). When the specific requirement is satisfied, the setting of the upper limit position by the operation input signal is denied and the upper limit position is instead set to the actual height of the ground work apparatus 22 based on the height detection signal (#07).

As shown in a lower half of FIG. 1, functions of the setting prohibitor 72 are described in detail using control drawings which are each enclosed in two frames. The setting prohibitor 72 issues an upper limit setting permission flag, when the upper limit position being set by the operation input signal is higher than the height of the ground work apparatus 22 based on the height detection signal, and the setting prohibitor 72 issues an upper limit setting prohibition flag when the upper limit position being set by the operation input signal is lower than the height of the ground work apparatus 22 based on the height detection signal. When the upper limit setting permission flag is issued, the upper limit operation signal from the input operation device for the upper limit setting USD is permitted by the upper limit manager 71, and the new setting of the upper limit becomes effective. When the upper limit setting prohibition flag is issued, the upper limit operation signal from the input operation device for the upper limit setting USD is ignored by the upper limit manager 71, and the actual upper limit position is set to the position corresponding to the height of the ground work apparatus 22 (actual height) based on the height detection signal.

Figure 2:
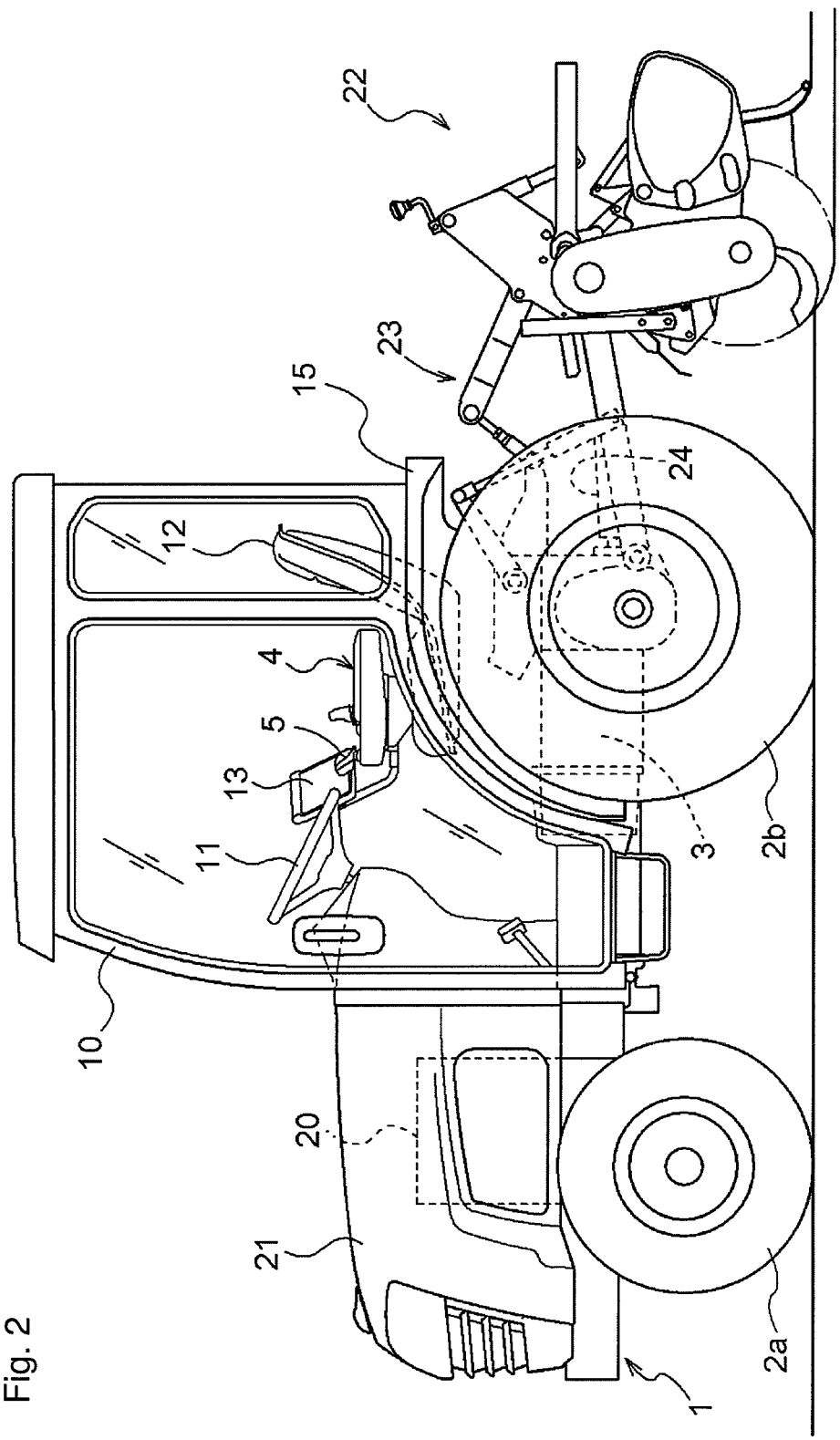
FIG. 2 is a side view of a tractor that is an example of a traveling work vehicle on which the lift control apparatus to the present invention is mounted.

Next, the specific embodiment of the lift control apparatus according to the present invention is described. FIG. 2 is a side view of a tractor as an example of a traveling work vehicle on which the lift control apparatus is mounted. In the tractor, an engine 20 is mounted on a front part of a vehicle body 1 of the tractor and a transmission 3 is mounted to a rear of the engine 20, the vehicle body 1 being supported by front wheels 2a and rear wheels 2b. To the rear of the vehicle body 1, a rotary tilling apparatus as the ground work apparatus 22 is equipped so as to be freely liftable via the lift mechanism 23. The tractor has four-wheel drive. Power of the engine 20 is transmitted to the front wheels 2a and the rear wheels 2b that are capable of acting as drive wheels, via a transmission mechanism installed inside the transmission 3. Further, the power of the engine 20 is also transmitted to the ground work apparatus 22 via a PTO shaft 24 that protrudes to the rear from the transmission 3. The engine 20 is covered by a hood 21. To the rear of the hood 21 and above the transmission 3, a cabin 10 is supported by the vehicle body 1.

An interior of the cabin 10 acts or functions as a driving space. At a front part of the driving space, a steering wheel 11 operating the front wheels 2a is arranged, and at a rear part of the driving space, a driver's seat 12 is arranged between a pair of left and right rear wheel fenders 15. From one side of the driver's seat 12 toward the front, an armrest operation device 4 having a multifunction operation tool 5 is provided. In front of the armrest operation device 4, a display 13 visually notifying the driver of various information is provided. The display 13 allows an input operation to be performed via a touch panel 13A (see FIG. 3) and can accept various operation inputs by the driver.

Figure 3:
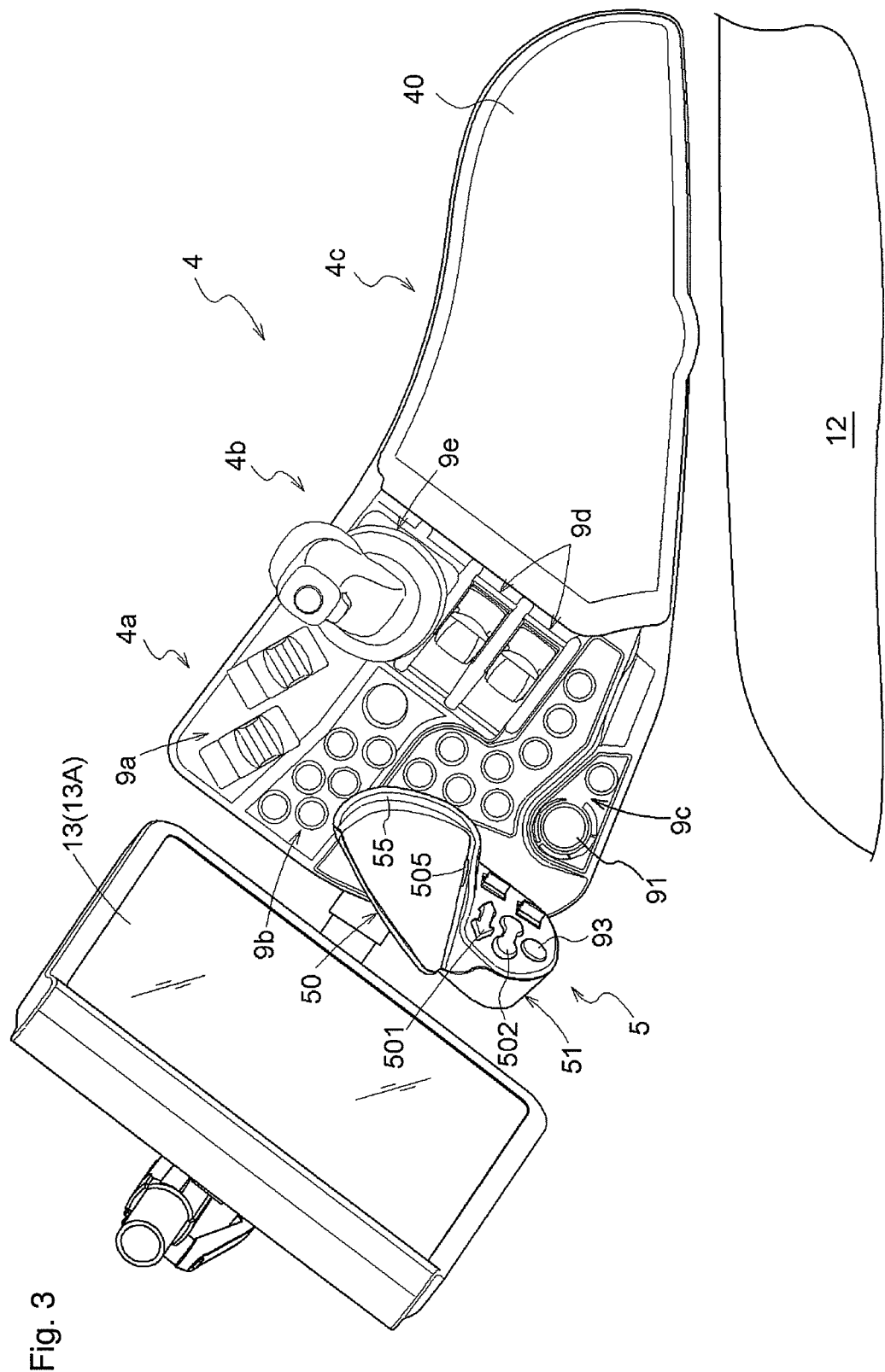
FIG. 3 is a plan view of an armrest operation device.

As shown in FIG. 3, the armrest operation device 4 can be divided, in a top or plan view, into a front area 4a, a middle area 4b, and a rear area 4c. In the rear area 4c, a cushioned armrest base 40 on which a driver's arm can rest is provided. In substantially a left half of the front area 4a, the multifunction operation tool 5 (described in detail below) is provided. In substantially a right half of the front area 4a, as part of operation switch groups 9, a first operation switch group 9a and a second operation switch group 9b, are arranged. Also in the middle area 4b, as part of the operation switch groups 9, a third operation switch group 9c, a fourth operation switch group 9d, and a fifth operation switch group 9e, are arranged from the left. In each of the operation switch groups 9, operation switches formed in various types are provided such as a button, a switch, a dial, a lever, and a joystick. To illustrate what can be utilized in the present invention, a setting dial 91, which sets a work position (tilling depth) of the ground work apparatus 22 is included and belongs to the third operation switch group 9c. By rotationally operating this setting dial 91, the work position of the group work apparatus 22 can be adjusted.

Figure 4:
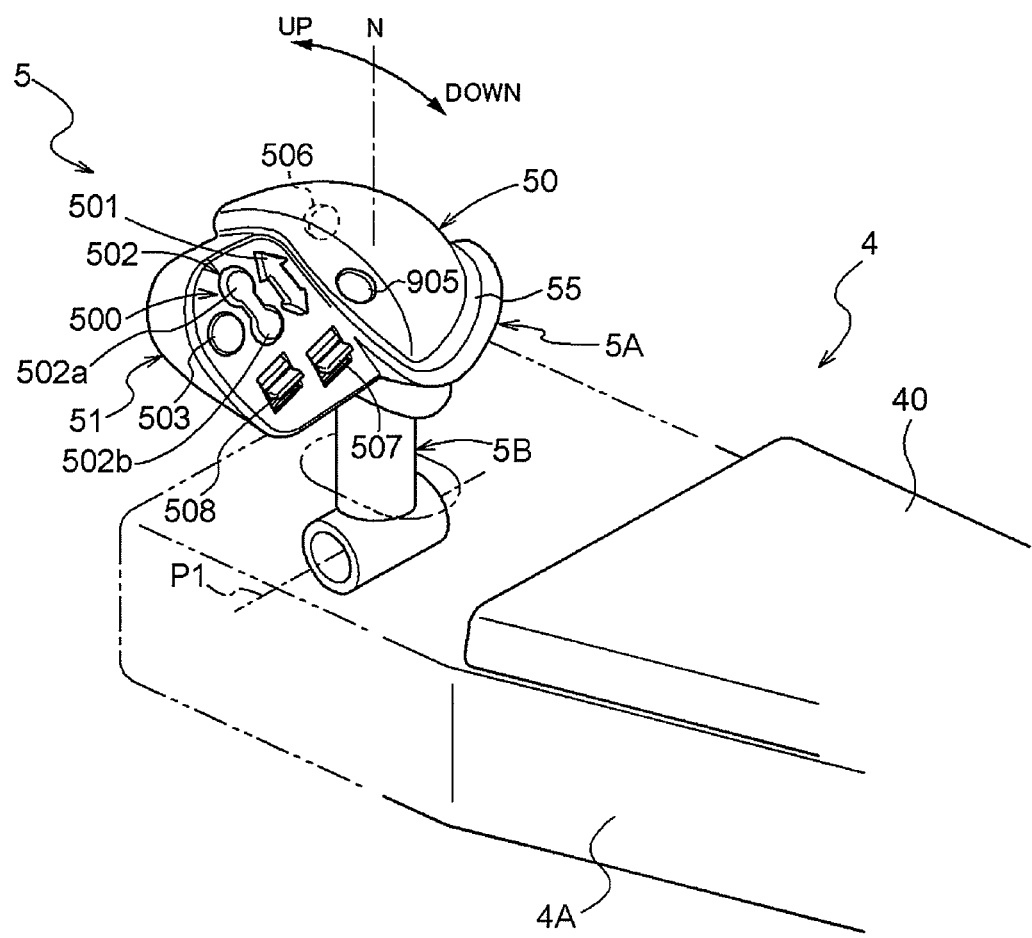
FIG. 4 is a perspective view of a multifunction operation tool arranged in the armrest operation device.

As shown in FIG. 4, the multifunction operation tool 5 is arranged in a front end area on the left side of the armrest base 40 and is swingably supported around a swing axis P1. The multifunction operation tool 5 is used to control a traveling state of the tractor and a state of the ground work apparatus 22 being equipped on the tractor. The multifunction operation tool 5 includes substantially a grip body 5A and a swing body 5B. The swing body 5B is formed as an arm member that swings around the swing axis P1. The vehicle is structured to accelerate by swinging the swing body 5B in a forward direction (UP) (upshift) from a swing neutral position of the swing body 5B, and to decelerate by swinging the swing body 5B in a backward direction (DOWN) (downshift).

The grip body 5A is provided on a free end side of the swing body 5B. As shown in FIG. 4, the grip body 5A includes a grip part 50 that is formed in a right side area (substantially a right half area in this example) and an extension part 51 that is formed in a left half area. A tongue piece protruding outward is formed as a hypothenar rest 55 on at least a portion of a lower edge of the grip 50.

An operation switch group 500 is arranged on the grip body 5A, that allows operations with fingers of a hand holding the grip part 50. The operation switch group 500 includes a shuttle button 501, a speed change ratio fixing button 503, a speed change auxiliary button 505 and a shuttle auxiliary button 506 that belong to a travel-related operation switch group; and a lift button 502, two hydraulic control switches 507 and 508, and the like that belong to a work-related operation switch group. The speed change auxiliary button 505 and the shuttle auxiliary button 506 are arranged to be operable by an index finer or a middle finger of the hand holding the grip part 50, and the other buttons and switches are arranged to be operable by a thumb of the hand holding the grip part 50.

The lift button 502 acts as the lift operation tool to lift or lower the ground work apparatus 22, which is a tilling apparatus in this example, through operations of the lift mechanism 23. When an upper part 502a of the lift button 502 is pressed, the ground work apparatus 22 is lifted, and when a lower part 502b of the lift button 502 is pressed, the ground work apparatus 22 is lowered.

Switching (shift up, shift down) of a speed change in the transmission 3 is performed by a swinging operation around the swing axis P1 of the grip part 50. The transmission 3 includes a main speed change device and an auxiliary speed change device. The switching operation of the speed change having only the main speed change device without involving the auxiliary speed change device is effective even without pressing the speed change auxiliary button 505. However, the switching operation of the speed change having the auxiliary speed change device is structured to have no effect unless the speed change auxiliary button 505 is pressed. Further, by pressing an upward arrow of the shuttle button 501 while the shuttle auxiliary button 506 is pressed, the tractor is switched to a forward travel state, and by pressing a downward arrow of the shuttle button 501 while the shuttle auxiliary button 506 is pressed, the tractor is switched to a reverse travel state.

Figure 5:
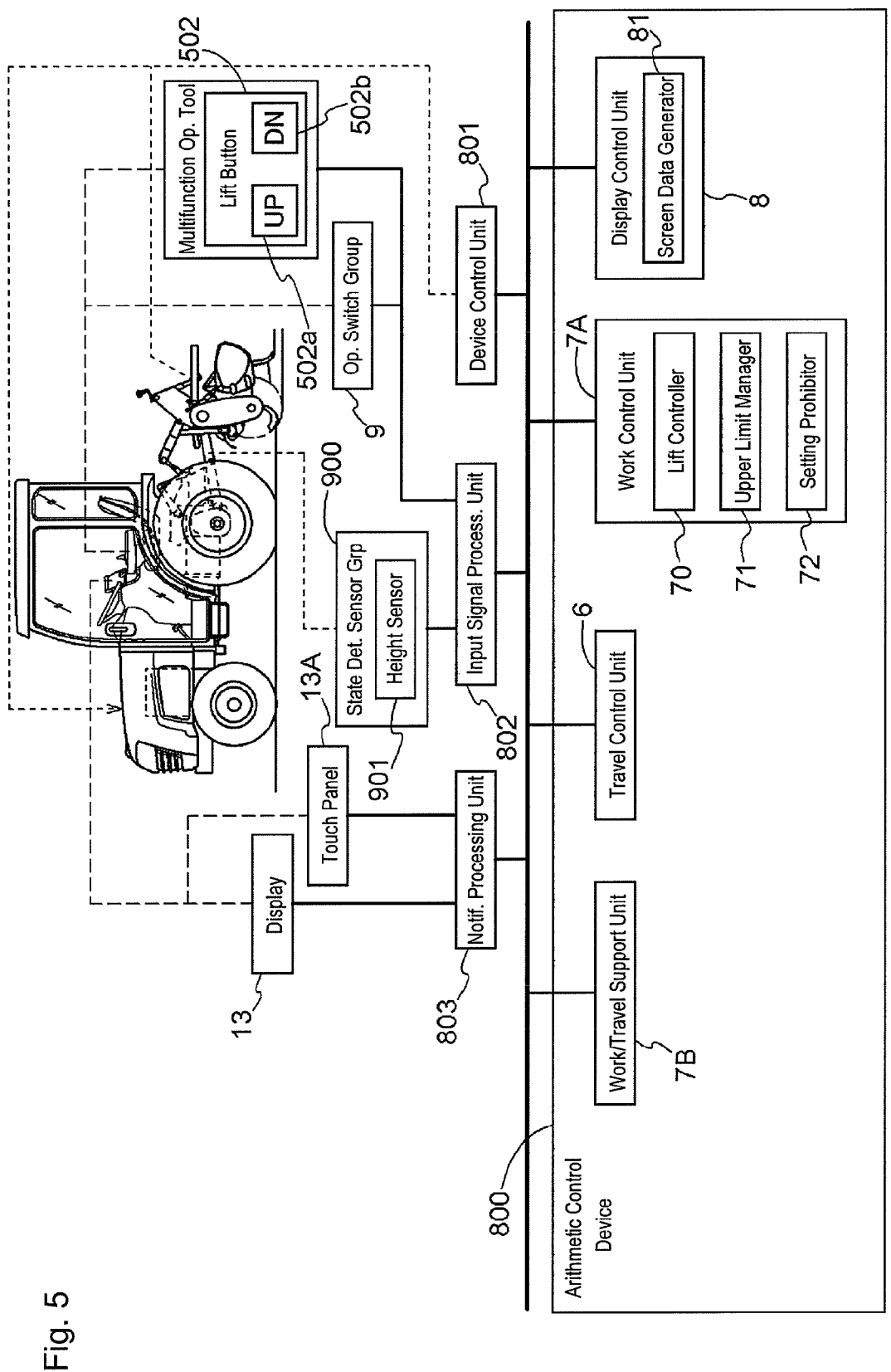
FIG. 5 is a functional block diagram illustrating functions of a control system that is equipped on the tractor, the functions being particularly related to the present invention.

In FIG. 5, a control system equipped on the tractor is illustrated in the form of a functional block diagram. In the control system, functional elements being realized mainly by computer programs are shown as an arithmetic control device 800. This division is merely for explanatory purposes. For a construction of an actual control system, arbitrary division or integration is possible. The arithmetic control device 800 is connected to other units via an on-vehicle LAN or the like to allow data to be transmitted. Examples of such units include a device control unit 801, an input signal processing unit 802, a notification processing unit 803 and the like. Further, inside the arithmetic control device 800, each functional element and functional unit is also connected to one another via the on-vehicle LAN or other data transmission path to allow data to be transmitted.

The device control unit 801 transmits operation signals to various operation devices that are equipped to the engine 20, the transmission 3, the ground work apparatus 22, and the like, and controls operations thereof. The input signal processing unit 802, having an input interface function, inputs signals from the multifunction operation tool 5, the operation switch groups 9, and state detection sensor group 900, and transfers to each functional element of the control system. The lift button 502 is illustrated in this example, as one of various operation input functions included in the multifunction operation tool 5. As shown in FIG. 4, the lift button 502 includes a lift operator (indicated by symbol "UP" in FIG. 5) and a lower operator (indicated by symbol "DN" in FIG. 5). The state detection sensor group 900 also includes various sensors, and one example is the height sensor 901 that detects the height of the ground work apparatus 22. The notification processing unit 803 acts as an input/output interface and processes an image signal to the display 13, an audio signal to a speaker 14, and an operation input signal from the touch panel 13A.

The arithmetic control device 800 shown in FIG. 5 includes a travel control unit 6, a work control unit 7A, a work/travel support unit 7B, a display control unit 8, and the like.

The travel control unit 6, creates a vehicle speed change ratio with combinations from speed change states of the main speed change device and the auxiliary speed change device, by outputting, via the device control unit 801, a speed change control command to the main speed change device and the auxiliary speed change device that configure the transmission 3.

The work/travel support unit 7B manages information for the driver, such as notices and warnings based on the signals from some work/travel automation and the state detection sensor group 900.

The work control unit 7A controls the lift mechanism 23 and the ground work apparatus 22 based on the signals from the working operation buttons included in the multifunction operation tool 5 and the signals from the working operation switch groups 9. The work control unit 7A is configured to implement all of the basic functions related to the upper limit setting control that was described with FIG. 1. For this reason, a lift controller 70, the upper limit manager 71, and the setting prohibitor 72 are constructed in the work control unit 7A. The lift controller 70 generates the control data for the lift mechanism 23 based on the operation input signals from the lift button 502 acting as a lift operation tool and controls a lift of the ground work apparatus 22 via the device control unit 801. The lift controller 70 adjusts a lift speed of the ground work apparatus 22 based on the operation input signals from operation switch groups 9. The functions of the upper limit manager 71 and the setting prohibitor 72 are as described with the FIG. 1.

Figure 6:
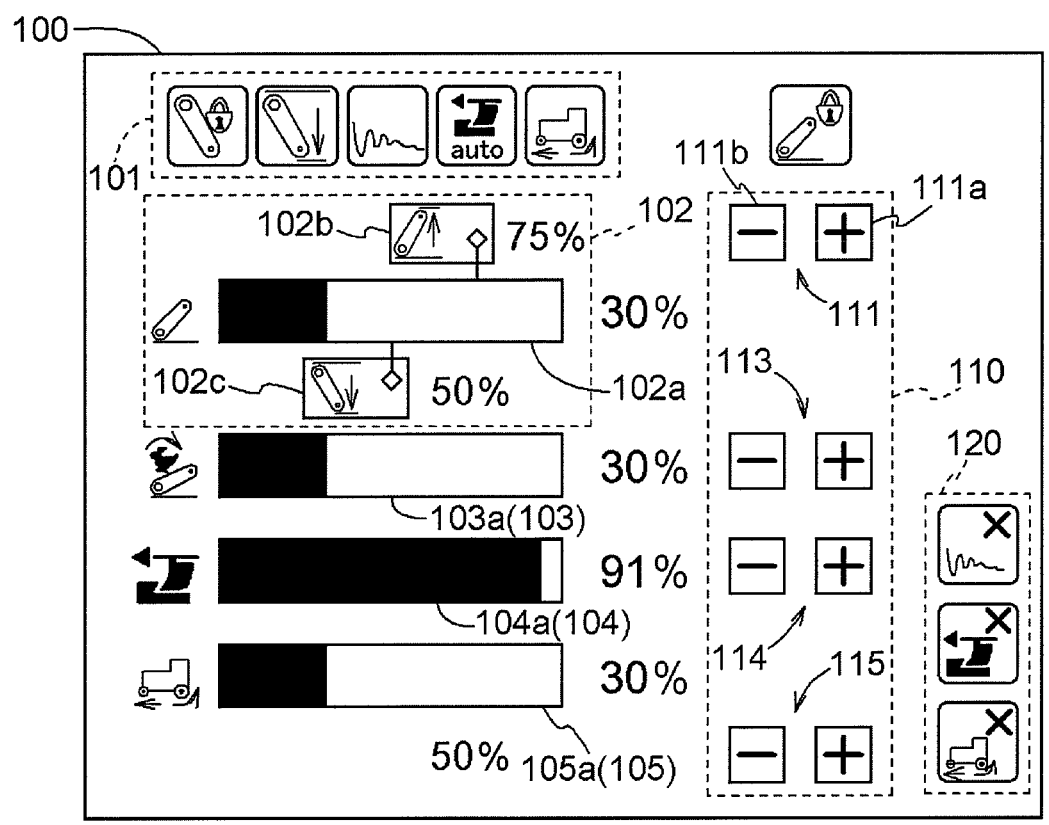
FIG. 6 is a screen diagram illustrating an example of a lift control screen that displays on a display.

The display control unit 8 has the screen data generator 81 and displays a desired screen on the display 13 by transferring to a notification processing unit 803, a screen data generated with the screen data generator 81. FIG. 6 shows a lift control screen which is an operation screen related to the ground work apparatus 22. The lift control screen data to display the lift control screen on the display 13 is generated by the screen data generator 81 (see FIG. 3).

On a left half of the lift control screen, from the top, a status display icon display area 101, a lift status display area 102, a lift speed display area 103, a reverse depth display area 104, and a slip quantity display area 105 are arranged. To the right near the center of the lift control screen, an increase/decrease button display area 110 is arranged. Further, on the right edge of the lift control screen, various switches display area 120 is arranged.

On the lift status display area 102, a lift height display meter 102a formed in a horizontal bar chart and schematically illustrated in FIG. 1, an upper limit display symbol 102b, and a work position (tilling height) symbol 102c are displayed. A left side of the lift height display meter 102a indicates a lowering lift stroke edge and a right side indicates a lifting lift stroke edge. The actual height of the ground work apparatus 22 is indicated by filled-in color. Meanwhile, a numeric value is displayed in a percent indication (i.e., actual height in relation to lift stroke) on a right side of the lift height display meter 102a. An upper limit indicator is added to the upper limit display symbol 102b and the indicator shows an upper limit position of the lift stroke. A numeric value is displayed in a percent indication (i.e., upper limit in relation to the lift stroke) next to the upper limit display symbol 102b. A numeric value is also displayed in a percent indication (i.e., work position in relation to the lift stroke) next to the work position symbol 102c. In addition, an upper limit setting switch 111, is arranged on the increase/decrease button display area 110, as the input operation device for the upper limit setting USD to set the upper limit position, side by side to the upper limit display symbol 102. The upper limit setting switch 111 is a software or touch screen switch having an upper limit increase switch 111a and an upper limit decrease switch 111b, and the upper limit positions can be adjusted by pressing these switches corresponding to the touch panel 13A.

Further, a touch operation function can be added to allow setting of an upper limit, by directly touching the lift status display area 102 with a finger. The touch operation function can be used in place of or together with the upper limit setting switch 111 described above. Specifically, a two touch configuration can be used where the touch operation function starts by touching on the upper limit display symbol 102b, and a touched position on the lift height display meter 102a becomes a new upper limit position. In such a touch operation, due to a possibility of touching a lower position than the actual height, it becomes extremely important to prevent the upper limit from being set lower than the actual height according to the present invention. Furthermore, a configuration can be used, in place of the above-described two touch configuration, where the upper limit can be set by shifting sideways (swipe operation) while touching the lift height display meter 102a.

Display meters 103a, 104a, and 105a formed in a horizontal bar chart are also arranged respectively to display setting values inside the lift speed display area 103, the reverse depth display area 104, and the slip quantity display area 105. Further, a numeric value is displayed in a percent indication (in relation to the whole) on the right side of each horizontal bar chart. Furthermore, increase/decrease switches 113, 114, and 115 are also arranged to adjust the setting value.

An upper limit is lowered by pushing the upper limit decrease switch 111b to a point where the actual height is set, and when the upper limit falls below the actual height, the amount below the actual height is ignored by the setting prohibitor 72. In another words, even though the upper limit decrease switch 111b is kept being pushed, the upper limit stops when reaching the actual height. Utilizing this capability, in a case of setting the upper limit near the actual height, the upper limit may be stopped at the actual height position by continuously pushing the upper limit decrease switch 111b and by pushing the upper limit increase switch 111a. This way, it becomes possible to set the upper limit to a desired position.

Other Non-Limiting Embodiments (1) In the above-described embodiment, the lift status display area 102 is arranged on the same screen with the display area 103, the reverse depth display area 104, and the slip quantity display area 105. However, only the lift status display area 102 can be exclusively shown on a single display screen, when having difficulty seeing the display due to the size of the display 13 or the like.

(2) In place of the upper limit setting switch 111 configured using the software, virtual or touch screen switches, which is used in the above-described embodiment, the upper limit setting switch 111 may be employed with hardware switches that are provided in the armrest operation device 4 and the like. Further, it is also possible to prepare both software switches and hardware switches.

(3) The display 13 may be arranged at a different position, apart from the armrest operation device 4. Further, it is also possible that a plurality of displays 13 are provided mirroring one another.

(4) The functional blocks in FIG. 5 are merely for illustration purposes. The respective function units can be arbitrarily integrated or divided. Specifically, the respective functional elements configured in the arithmetic control device 800 may be overlapped due to mutual linking via software, and the functions in reality overlap one another in many cases. The functional elements illustrated in FIG. 5 are only displayed schematically and are not limited to the one illustrated in FIG. 5.

In addition to a tractor, the traveling work vehicle according to the present invention is applicable to an agricultural work vehicle such as a rice transplanter or a combine harvester, or a work vehicle for construction and civil engineering such as a front loader, or the like.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A lift control apparatus for a ground work apparatus of a traveling work vehicle, comprising:
    a height sensor configured to generate a height detection signal indicative of an actual height position of the ground work apparatus;
    an input operation device configured to accept an input of an upper limit position setting from an operator for the ground work apparatus;
    an upper limit manager configured to set the upper limit position of the ground work apparatus based on an operation input signal from the input operation device; and
    a setting prohibitor configured to set the upper limit position as the actual height position of the ground work apparatus, under a certain condition;
    the setting prohibitor being further configured to determine that the certain condition occurs when the upper limit position being set based on the operation input signal is lower than the actual height position of the ground work apparatus, as detected by the height sensor.

2. The lift control apparatus according to claim 1, wherein the ground work apparatus is coupled to a vehicle body of the traveling work vehicle via a lift mechanism.

3. The lift control apparatus according to claim 1, wherein the height sensor is configured to output the height detection signal after detecting said actual height position and said actual height position represents a height of the ground work apparatus in relation to a ground surface.

4. The lift control apparatus according to claim 1, wherein the actual height position of the ground work apparatus is a height of the ground work apparatus in relation to a ground surface.

5. The lift control apparatus according to claim 4, wherein the input operation device is further configured to set the upper limit position to the actual height position of the ground work apparatus based on the height detection signal.

6. The lift control apparatus according to claim 1, wherein the input operation device is further configured to set the upper limit position to the actual height position of the ground work apparatus based on the height detection signal.

7. The lift control apparatus according to claim 1, further comprising:
    a screen data generator that generates displayable lift control screen data on a display.

8. The lift control apparatus according to claim 7, wherein the displayable lift control screen data comprise:
    the actual height position of the ground work apparatus; and
    the upper limit position setting.

9. The lift control apparatus according to claim 8, wherein the displayable lift control screen data includes a height scale bar.

10. The lift control apparatus according to claim 9, wherein the height scale bar indicates both the actual height position of ground work apparatus and the upper limit position setting.

11. The lift control apparatus according to claim 10, wherein the actual height position of the ground work apparatus and the upper limit position setting are indicated on the height scale bar as one of:
    a percentage value; and
    a rate in relation to a maximum lift stroke.

12. The lift control apparatus according to claim 11, wherein the display is a touch screen or panel.

13. The lift control apparatus according to claim 12, wherein the display displays a switch allowing the operator to set the upper limit position setting.

14. The lift control apparatus according to claim 10, wherein the display is a touch screen or panel.

15. The lift control apparatus according to claim 14, wherein the display displays a switch allowing the operator to set the upper limit position setting.

16. The lift control apparatus according to claim 7, wherein the display is a touch screen or panel.

17. The lift control apparatus according to claim 16, wherein the display displays a switch allowing the operator to set the upper limit position setting.

18. A lift control apparatus for a ground work apparatus of a traveling work vehicle, comprising:
    a height sensor configured to generate a height detection signal indicative of an actual height position of the ground work apparatus in relation to a ground surface;
    an input operation device configured to accept an input of an upper limit position setting from an operator of the ground work apparatus;
    an upper limit manager configured to each of:
        allow the operator to change the upper limit position setting to the actual height position of the ground work apparatus via the input operation device under a first condition; and
        prohibit the operator from changing the upper limit position via the input operation device under a second condition;

wherein the first condition occurs when the upper limit position setting is higher than the actual height position of the ground work apparatus, as detected by the height sensor; and wherein the second condition occurs when the upper limit position setting is lower than the actual height position of the ground work apparatus, as detected by the height sensor.

19. A lift control apparatus for a ground work apparatus of a traveling work vehicle, comprising:
 a height sensor configured to generate a height detection signal indicative of an actual height position of the ground work apparatus in relation to a ground surface;
 a touch screen display configured to allow an operator to change an upper limit position setting and being configured to display the actual height position of the ground work apparatus, as detected by the height sensor;
 an upper limit manager configured to each of:
  allow the operator to change the upper limit position setting to the actual height position of the ground work apparatus via the touch screen display under a first condition; and
  prohibit the operator from changing the upper limit position via the tough screen display under a second condition;
 wherein the first condition occurs when the upper limit position setting is higher than the actual height position of the ground work apparatus, as detected by the height sensor; and
 wherein the second condition occurs when the upper limit position setting is lower than the actual height position of the ground work apparatus, as detected by the height sensor.

* * * * *